United States Patent [19]

Tomiyama et al.

[11] Patent Number: 5,464,722
[45] Date of Patent: Nov. 7, 1995

[54] PRODUCTION OF TONER FOR DEVELOPING ELECTROSTATIC IMAGES

[75] Inventors: Koichi Tomiyama, Kawasaki; Hiroshi Yusa, Machida; Takakuni Kobori, Kawasaki, all of Japan

[73] Assignee: Canon Kabushiki Kaisha, Tokyo, Japan

[21] Appl. No.: 176,231

[22] Filed: Jan. 3, 1994

[30] Foreign Application Priority Data

Jan. 11, 1993 [JP] Japan .................. 5-017884
Jan. 11, 1993 [JP] Japan .................. 5-017887

[51] Int. Cl.⁶ .................................................. G03G 9/087
[52] U.S. Cl. .................................................. 430/137
[58] Field of Search .................................. 430/109, 110, 430/137

[56] References Cited

U.S. PATENT DOCUMENTS

| | | | |
|---|---|---|---|
| 4,839,255 | 6/1989 | Hyosu et al. | 430/137 |
| 5,066,558 | 11/1991 | Hikake et al. | 430/109 |
| 5,139,914 | 8/1992 | Tomiyama et al. | 430/106.6 |
| 5,262,267 | 11/1993 | Takiguchi et al. | 430/122 |
| 5,270,143 | 12/1993 | Tomiyama et al. | 430/109 |
| 5,270,770 | 12/1993 | Kukimoto et al. | 355/274 |

OTHER PUBLICATIONS

Database WPI, Week 7949, Derwent Pub. AN79–88488B (49).
Database WPI, Week 7921, Derwent Pub. AN79–39847B (21).
Patent Abstract of Japan, vol. 10, No. 226 (C–364) (2282) Aug. 1986.
Patent Abstract of Japan, vol. 9, No. 64 (P–343) Mar. 1985.
Patent Abstract of Japan, vol. 6, No. 195 (P–146) (1073) Oct. 1982.
Patent Abstract of Japan, vol. 7, No. 54 (P–180) 1199) Mar. 1983.

*Primary Examiner*—John Goodrow
*Attorney, Agent, or Firm*—Fitzpatrick, Cella, Harper & Scinto

[57] ABSTRACT

A toner for developing electrostatic images is produced through a process including the steps of: pre-mixing binder resin particles carrying or containing inorganic fine powder to prepare a premix; melt-kneading the premix to obtain a kneaded product; cooling the kneaded product to obtain a colored resinous solid; pulverizing the colored resinous solid to obtain a pulverized product; and classifying the pulverized product to obtain toner particles. The inclusion of the resin particles carrying or containing inorganic fine powder improves the performance of the pre-mixing to provide an improved dispersion of toner materials within the product toner particles. A fine powder fraction from the classifying step can also be recycled to the premixing step. The resin particles can be toner particles per se. The inorganic fine powder may preferably be silica fine powder treated with silicone oil.

29 Claims, 10 Drawing Sheets

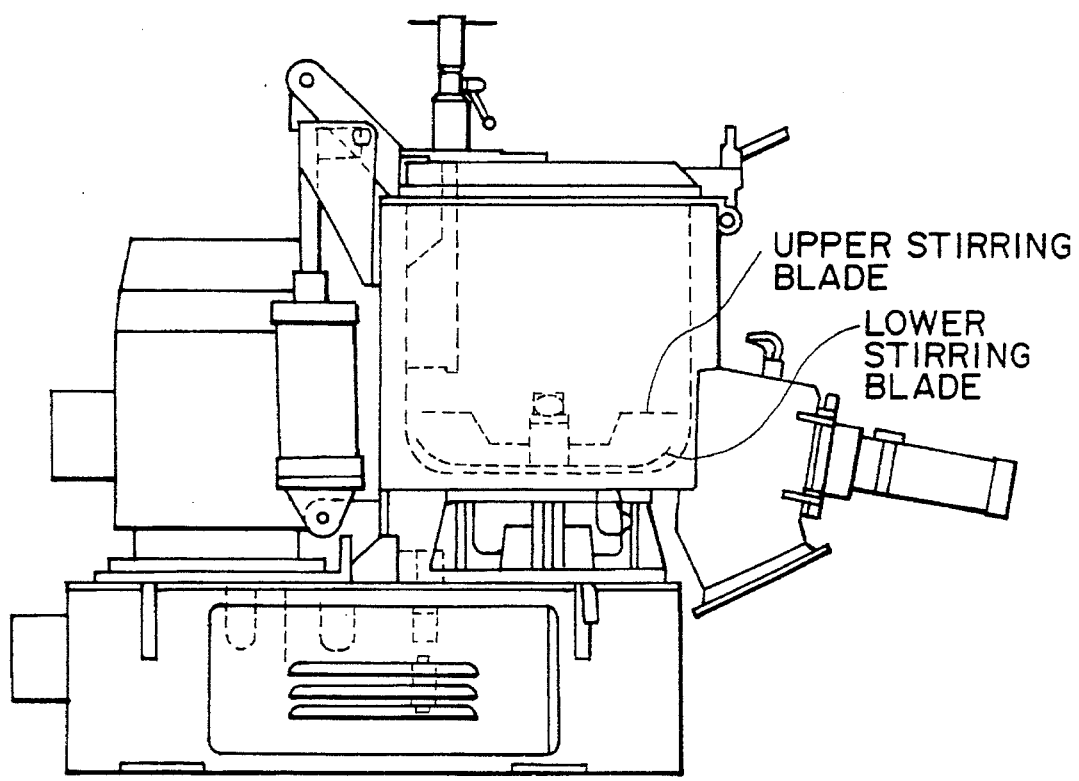
F I G. 3
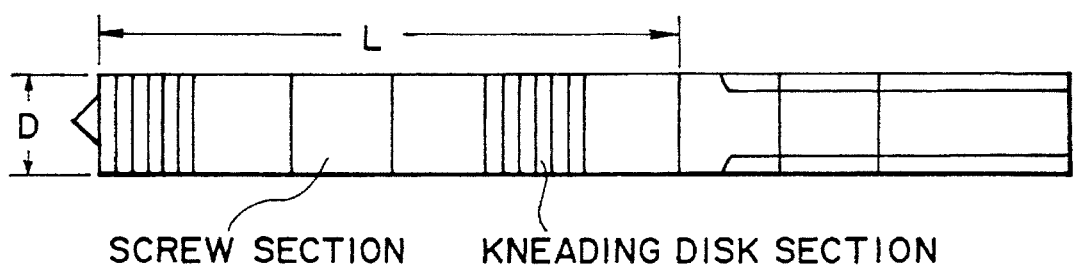
F I G. 4

PRODUCTION OF TONER FOR DEVELOPING ELECTROSTATIC IMAGES

FIELD OF THE INVENTION AND RELATED ART

The present invention relates to a process for producing a toner for developing (visualizing) electrostatic latent images in image forming methods, such as electrophotography and electrostatic recording, and a toner obtained through the process.

In electrophotography, an electric latent image is formed on a photosensitive member generally comprising a photoconductive substance by various methods and developed with a toner to form a toner image thereon. The toner image is thereafter transferred onto a transfer-receiving material, such as paper, as desired, and fixed onto the transfer-receiving material by various methods to obtain a copy product.

The toner is generally classified into a dry toner and a wet toner. Because the wet toner contains a solvent accompanied with problems, such as evaporation, recovery and odor thereof, the dry toner has been predominantly used in recent years.

The dry toner in a powdery form is required to show various functions in order to effect accurate image formation with the toner. The required functions may include, for example, chargeability, conveyability, fixability, color and preservability. Accordingly, the toner is produced as a mixture of various materials.

Such dry toners may be formed through, e.g., pulverization, polymerization or encapsulation. The pulverization process is principally adopted. The toner production through the pulverization process generally includes a pre-mixing step for blending various materials inclusive of a binder resin for allowing fixation onto the transfer-receiving material, various colorants for providing a hue for the toner, and also a charge control agent, a magnetic material, and a release agent; a melt-kneading step for melt-kneading the pre-mixed materials under heating and application of a shearing force by kneading means; a pulverization step including coarse pulverization of the kneaded product after cooling and solidification and fine pulverization by, e.g., a jet mill, into a particle size appropriate for a toner; and a classification step for uniformizing the particle size to provide a particle size distribution suitable for exhibiting sufficient performances as a toner. The classified particles may be further dry-blended, as desired, with additives, such as a flowability improver, a lubricating agent, an abrasive, etc., to provide a product toner. The toner may be further blended with, e.g., various magnetic carriers to provide a two-component type developer, suitable for image formation.

In the toner production through the pulverization process, the state of dispersion of various toner materials within the toner particles is substantially determined in the pre-mixing step and the kneading step. The pre-mixing may generally be performed by a planet stirrer-type blender, such as a Nauta mixer, or a blade stirrer-type blender. The materials pre-mixed by these apparatus are melt-kneaded. The kneading apparatus may include various types, and an extruder capable of continuous kneading is ordinarily used now as it is adapted for mass-production.

In recent years, along with improved performances of image forming apparatus, such as copying machines, and printers (inclusive of laser beam printers and LED printers), the toner used therefor is also required to show better performances. Even if a high-performance toner is intended to be obtained, the production of a satisfactory toner has failed in many cases through the above-mentioned processes because of difficulties in fine dispersion of a colorant, wetting between the colorant and a binder resin, dispersion of other additives, etc. If the dispersion or wetting is insufficient, the resultant toner is liable to cause difficulties, such as a decrease in image density, instability of performances under various environmental conditions, and soiling of a developing sleeve, a carrier, etc.

As a further factor to consider, there has been used recently a contact transfer means, such as a transfer roller, for transferring a toner image on a photosensitive member to a transfer-receiving material from a viewpoint of ecology, i.e., to suppress the generation of ozone. In case where such a contact transfer means is used, a "transfer dropout" as shown in FIG. 11B is liable to be caused, so that a toner free from such a transfer dropout is desired as well as an effective process for production thereof.

SUMMARY OF THE INVENTION

An object of the present invention is to provide a process for producing a toner for developing electrostatic images showing higher performances, through improvement in dispersion of toner (starting) materials or ingredients.

Another object of the present invention is to provide a process for producing a toner for developing electrostatic images containing toner materials in stable proportions.

Another object of the present invention is to provide a process for producing a toner for developing electrostatic images free from localization of toner materials and showing excellent performances, inclusive of good developing performance, good successive image forming characteristic, little fog, good reproducibility of minute dots and good environmental characteristics.

Another object of the present invention is to provide a process for producing a toner not liable to cause "transfer dropout".

A further object of the present invention is to provide a toner produced through a process as described above.

According to the present invention, there is provided a process for producing a toner for developing electrostatic images, comprising:

pre-mixing binder resin particles carrying or containing inorganic fine powder to prepare a premix, melt-kneading the premix to obtain a kneaded product, cooling the kneaded product to obtain a colored resinous solid, pulverizing the colored resinous solid to obtain a pulverized product, and classifying the pulverized product to obtain toner particles.

According to another aspect of the present invention, there is provided a toner produced by the above-mentioned process.

These and other objects, features and advantages of the present invention will become more apparent upon a consideration of the following description of the preferred embodiments of the present invention taken in conjunction with the accompanying drawings, wherein like parts and denoted by like reference numerals.

BRIEF DESCRIPTION OF THE DRAWINGS

FIG. 3 is a schematic illustration of a Henschel mixer as an embodiment of a dry blender used in pre-mixing.

FIG. 4 is an illustration of an extruder screw.

DETAILED DESCRIPTION OF THE INVENTION

As described above, in the toner production according to the pulverization process, starting materials used are pre-mixed by a blender including a planet stirrer-type blender, such as a Nauta mixer, or a blender including rotating blades, such as a Henschel mixer, and then melt-kneaded. In the melt-kneading step, it has been a general practice to use an extruder adapted for mass production of toners in recent years. The extruder may be of a single screw-type or a twin screw-type and can effect continuous kneading so that it is suitably and advantageously used for continuous toner production.

The dispersion of toner (starting) materials within a toner do not solely depend on the dispersing ability of a kneading machine. In toner production using a large number of starting materials, there is posed a limitation in dispersing ability of the kneading machine. In an extruder, for example, there is inherently a limitation of residence time because of a continuous flow characteristic thereof, and the short residence time can cause insufficient dispersion. Further, even if residence time is increased as long as possible, the kneading machine per se has a limitation of dispersing ability. This is supplemented by pre-mixing, and the performance of the pre-mixing can substantially affect the degree of dispersion of the toner materials within the product toner. However, in a pre-mixing step as described above, the toner materials are not microscopically dispersed. As a result, even if the conditions of the pre-mixing and the kneading are optimized, a satisfactory dispersion of toner materials within a toner cannot be accomplished in some cases.

For example, in the pre-mixing step, a fine material such as a colorant can adhere to the inner wall of a blender, it becomes impossible to obtain a mixture of toner materials in optimum proportions in some cases.

Further, when the particle sizes of the toner materials are noted, it is generally assumed that smaller particles provide better dispersion but actually there is a tendency that the resultant increased agglomerability hinders a satisfactory dispersion in the pre-mixing. Further, smaller particles are liable to include a larger amount of air and provide a difficulty in obtaining sufficient dispersion during kneading.

Figure 1:
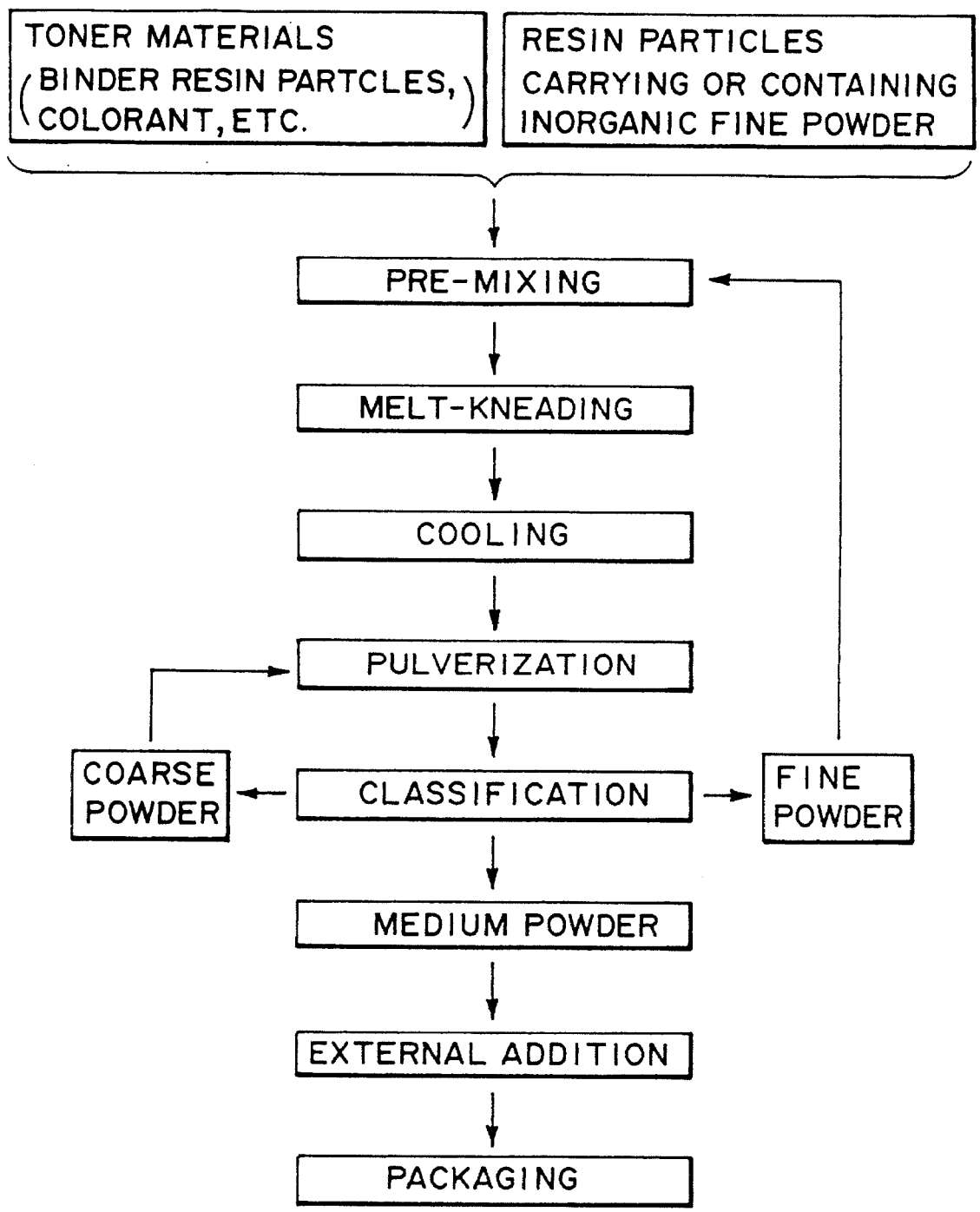
FIG. 1 is a flow chart showing an embodiment of the toner production process according to the present invention.
Figure 2:
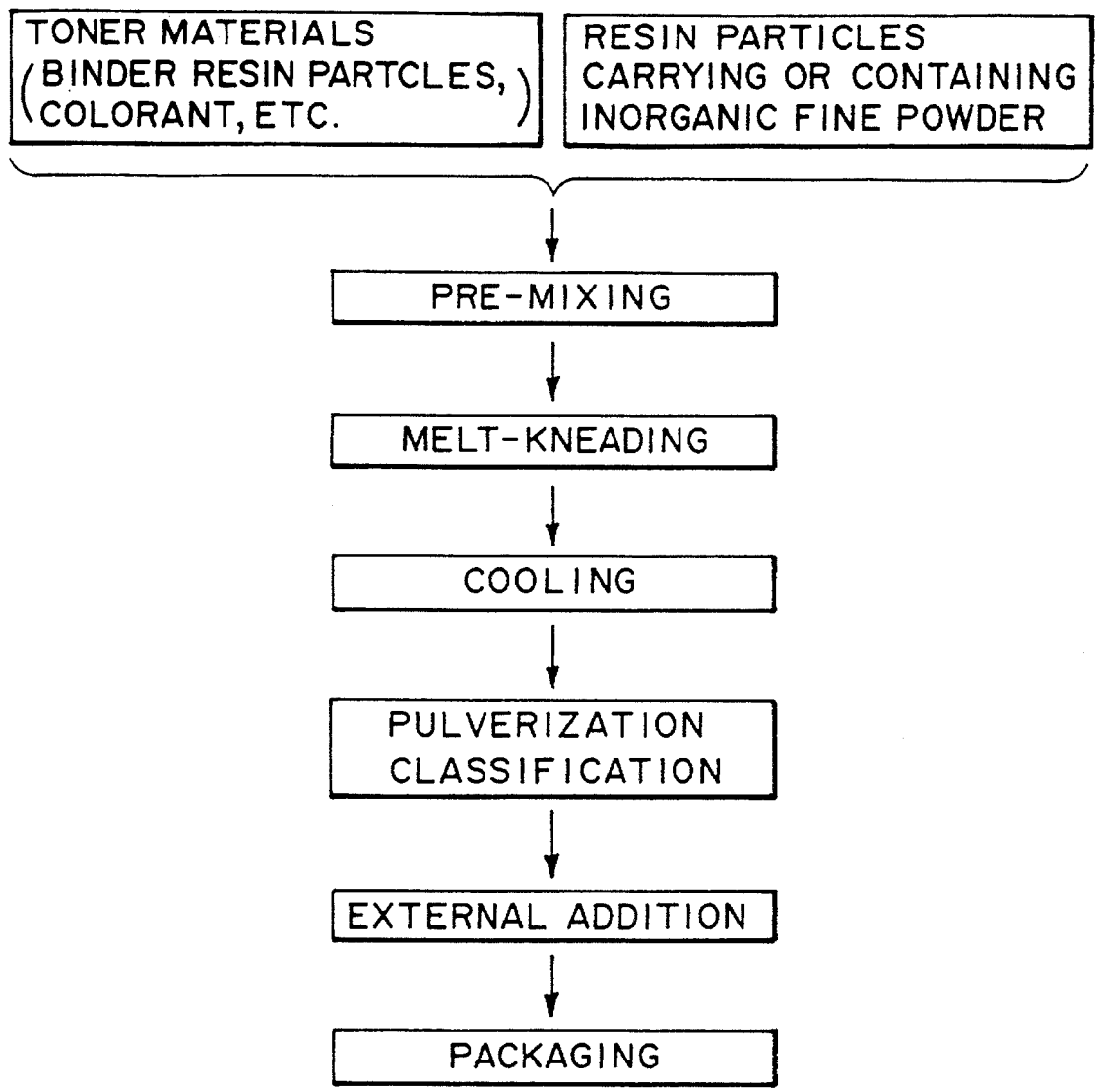
FIG. 2 is a flow chart showing another embodiment of the toner production process according to the present invention.

In the present invention, in order to solve the above-mentioned problems, resin particles carrying or containing inorganic fine powder as a result of external addition are added to toner materials to be processed in the pre-mixing as shown in FIG. 1 or 2.

Particularly, by adding the resin particles carrying or containing inorganic fine powder to the toner materials, the dispersibility of the toner materials is improved in the pre-mixing step. By adding the resin particles carrying inorganic fine powder on the surface, fine powdery materials, such as a colorant, a charge control agent and a fine powder fraction of a binder resin, within the toner materials are prevented from adhering to the inner wall of the blender, and mutual dispersion of the toner materials is improved. This is presumably because the inorganic fine powder externally added to the resin particles is dispersed within the toner materials to improve the flowability of the entire mixture, thus suppressing the attachment of the toner materials, and the resin particles having a good flowability function to scrape off the toner materials attached to the inner wall or blade of the blender, thereby improving the dispersibility of the toner materials and stabilizing the mixing ratios among the toner materials.

The resin particles with inorganic fine powder externally added thereto may preferably be incorporated in a proportion of 1–50 wt. %, more preferably 2–40 wt. %, of all the toner materials subjected to the pre-mixing. If the content is below 1 wt. %, the above described effects are scarcely observed. On the other hand, if the content exceeds 50 wt. %, the amount of air included is liable to become excessive, thereby resulting in poor dispersion of the toner materials and a product toner having an inferior anti-offset characteristic.

The resin particles with externally added inorganic fine powder may preferably comprise components identical to those constituting an objective toner. In case where the components are remarkably different, problems such as foggy images are liable to be caused. For this reason, it is preferred to use toner particles as the resin particles.

The toner produced through the present invention may be either a magnetic toner or a non-magnetic toner, but the present invention is particularly effective when applied to the production of a magnetic toner. The reason therefor has not been fully clarified as yet but may be attributable to the following factors. In the case of producing a magnetic toner, magnetic iron oxide and other materials, such as a binder resin, constituting the magnetic toner have a large difference in specific gravity, so that the dispersion of the toner materials is liable to be inferior as compared with the case of blending toner materials of similar specific gravities for producing a non-magnetic toner. When magnetic toner particles with externally added inorganic fine powder are added into such a system for producing a magnetic toner, the magnetic toner particles having a specific gravity intermediate between those of the magnetic iron oxide and the other toner materials, such as a binder resin, are copresent, and the added inorganic fine powder improves the flowability of the entire system, thereby improving mutual dispersion of the toner materials.

The inorganic fine powder may preferably be added in a proportion of 0.05–8.0 wt. %, more preferably 0.2–6.0 wt. %, of the resin particles. If the amount is less than 0.05 wt. %, the effect of the addition cannot be substantially obtained. On the other hand, in excess of 8.0 wt. %, the resultant toner is liable to have inferior performances, e.g., in respect of fixability.

The inorganic fine powder used for the above purpose may preferably be identical or similar in material to inorganic fine powder which may be added to an objective toner.

The resin particles used in the present invention can be used after being packed or molded into a certain size, e.g., up to 1–5 mm.

The resin particles carrying or containing inorganic fine powder used in the present invention can be a toner recovered from, e.g., a copying apparatus or a laser beam printer (LBP), and the use of such a recovered toner is advantageous in a decrease in toner production cost and preferable from a viewpoint of global environment.

In the present invention, as shown in FIG. 1, the resin particles carrying or containing inorganic fine powder may be added in combination with fine powder recycled from a classification step in a total amount of 2–60 wt. %, preferably 5–40 wt. %, of a total feed to the pre-mixing step, in addition to the toner materials.

By adding fine powder fraction in this manner, a moderate load can be applied in the pre-mixing step, thereby further improving the dispersibility.

The resin particles carrying or containing inorganic fine powder and the fine powder recycled from the classification step may preferably be blended in a weight ratio of 1:20–20:1. If the ratio is below 1:20, the flowability of the entire feed mixture to the pre-mixing step is liable to be inferior in the pre-mixing step. On the other hand, if the total amount of the resin particles and the fine powder exceeds 53 wt. % of the entire feed to the pre-mixing step and the ratio therebetween exceeds 20:1, the feed mixture processed in the pre-mixing step contains excessive air and the dispersibility of the toner materials is liable to be inferior.

The fine powder recycled from the classification step can be used as it is or used after being shaped into an average diameter of 0.05–5 mm, preferably 0.1–2 mm.

A major object thereof is to provide an additional load in the pre-mixing step so as to improve the dispersibility of the toner materials by incorporating large particles in the materials to be processed. If the average diameter is below 0.05 mm, the load in the pre-mixing step can be unsuitably lower. On the other hand, if the average diameter is larger than 5 mm, the load in the pre-mixing step can be excessively large to involve a large heat in the blender, thereby agglomerating the toner materials to degrade the dispersibility.

The fine powder used for the above purpose may preferably have a composition substantially identical to that of the objective toner. If the composition is substantially different, problems, such as fog in the resultant images, can occur.

The shaping of the fine powder recycled from the pulverization-classification step can be easily accomplished by using a commercially available shaping apparatus utilizing heat and pressure.

The average diameter may be measured according to the following method.

Shaped particles of fine powder are photographed through an optical microscope or an electron microscope at a magnification such that 150–350 of the particles are contained in the visual field, and the diameters of arbitrarily selected 100 particles in the photograph are measured by a caliper to obtain an average diameter.

Examples of the binder resin constituting the toner according to the present invention may include: homopolymers of styrene and its derivatives, such as polystyrene and polyvinyltoluene; styrene copolymers, such as styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, and styrene-maleic acid ester copolymers; polymethyl methacrylate, polybutyl methacrylate, polyvinyl acetate, polyethylene, polypropylene, polyvinyl butyral, silicone resin, polyester resin, polyamide resin, epoxy resin, polyacrylic acid resin, rosin, modified rosin, terpene resin, phenolic resin, aliphatic or alicyclic hydrocarbon resin, aromatic petroleum resin, paraffin wax, and carnauba wax. These resins may be used alone or in mixture. Particularly, styrene copolymers and polyester resins may be preferred in view of developing and fixing performances. The binder resin may preferably be supplied to the pre-mixing step in the form of particles having a number-average particle size of 10–1000 μm.

The colorant to be used may also comprise a known dye or pigment, examples of which may include: carbon black, lamp black, ultramarine, nigrosine dyes. Aniline Blue, Phthalocyanine Black, Phthalocyanine Green, Hansa Yellow G, Rhodamine 6G Lake, Chrome Yellow, quinacridone, Benzidine Yellow, Rose Bengal, triarylmethane dyes, monoazo dyes or pigments, disazo dyes or pigments, and anthraquinone dyes. These dyes or pigments may be used singly or in combination of two or more species.

These colorants may preferably be supplied to the pre-mixing step in a number-average secondary particle size of at most 3 μm, more preferably at most 1 μm.

In case where the colorant is a dye or pigment, the colorant may preferably be used in an amount of 2–20 wt. parts per 100 wt. parts of the binder resin.

In case where a magnetic toner is prepared according to the present invention, the magnetic toner contains a magnetic material which may also function as a colorant. Examples of such a magnetic material may include: iron oxides, such as magnetite, γ-iron oxide, ferrite, and excessive iron-containing ferrite; metal, such as iron, cobalt and nickel, and alloys of these metals with another metal, such as aluminum, cobalt, copper, lead, magnesium, tin, zinc, antimony, beryllium, bismuth, cadmium, calcium, manganese, selenium, titanium, tungsten or vanadium. Mixtures of these magnetic materials can also be used.

The magnetic material may preferably have a number-average particle size of 0.1–1 μm, more preferably 0.1–0.5 μm, further preferably 0.1–0.3 μm. The magnetic material may be contained in a proportion of 20–200 wt. parts, preferably 50–150 wt. parts, per 100 wt. parts of the resinous component in the magnetic toner.

In the toner according to the present invention, it is also possible to use hydrocarbon wax or ethylenic olefin polymers, as a fixing aid, in combination with the binder resin.

Examples of such ethylenic olefin homopolymers or copolymers may include: polyethylene, polypropylene, ethylene-propylene copolymer, ethylene-vinyl acetate copolymer, ethylene-ethyl acrylate copolymer, and ionomers having polyethylene skeletons. Among the copolymers, those including olefin monomer in proportion of at least 50 mol. %, particularly at least 60 mol. %, may be preferred.

The toner according to the present invention can contain a charge control agent. For a negatively chargeable toner, it is possible to use a negative charge control agent, such as metal complex salts of monoazo dyes, and metal complex salts of salicylic acid, alkylsalicylic acid, dialkylsalicylic acid or naphthoic acid.

Further, for a positively chargeable toner, it is possible to use a positive charge control agent, such as nigrosine compounds and organic quaternary ammonium salts.

The inorganic fine powder used for external addition to resin particles and/or a product toner may for example comprise silica fine powder, titanium oxide fine powder or alumina fine powder, which may preferably have a BET specific surface area of 50–400 $m^2/g$ as measured by nitrogen adsorption. Among these, silica fine powder is especially preferred, particularly one imparted with hydrophobicity. The hydrophobicity imparting-treatment may be effected by using a coupling agent, such as a silane coupling agent, and an organosilicon compound, such as silicone oil, alone or in combination. Silica fine powder treated with silicone oil is most preferred.

Generally, the hydrophobization is effected by chemically treating the inorganic fine powder with an organosilicon compound reacting with or physically adsorbed by the inorganic fine powder. In a particularly preferred method, the inorganic fine powder is treated with a silane coupling agent and with an organosilicon compound, such as a silicone oil, sequentially or simultaneously. The silicone oil may preferably be carried in a proportion of 1–35. wt. parts per 100 wt. parts of the inorganic fine powder. If the silicone oil is below 1 wt. part, the addition effect thereof is scarce and, if the amount exceeds 35 wt. parts, the inorganic fine powder is caused to have an excessively large secondary particle size.

Figure 9:
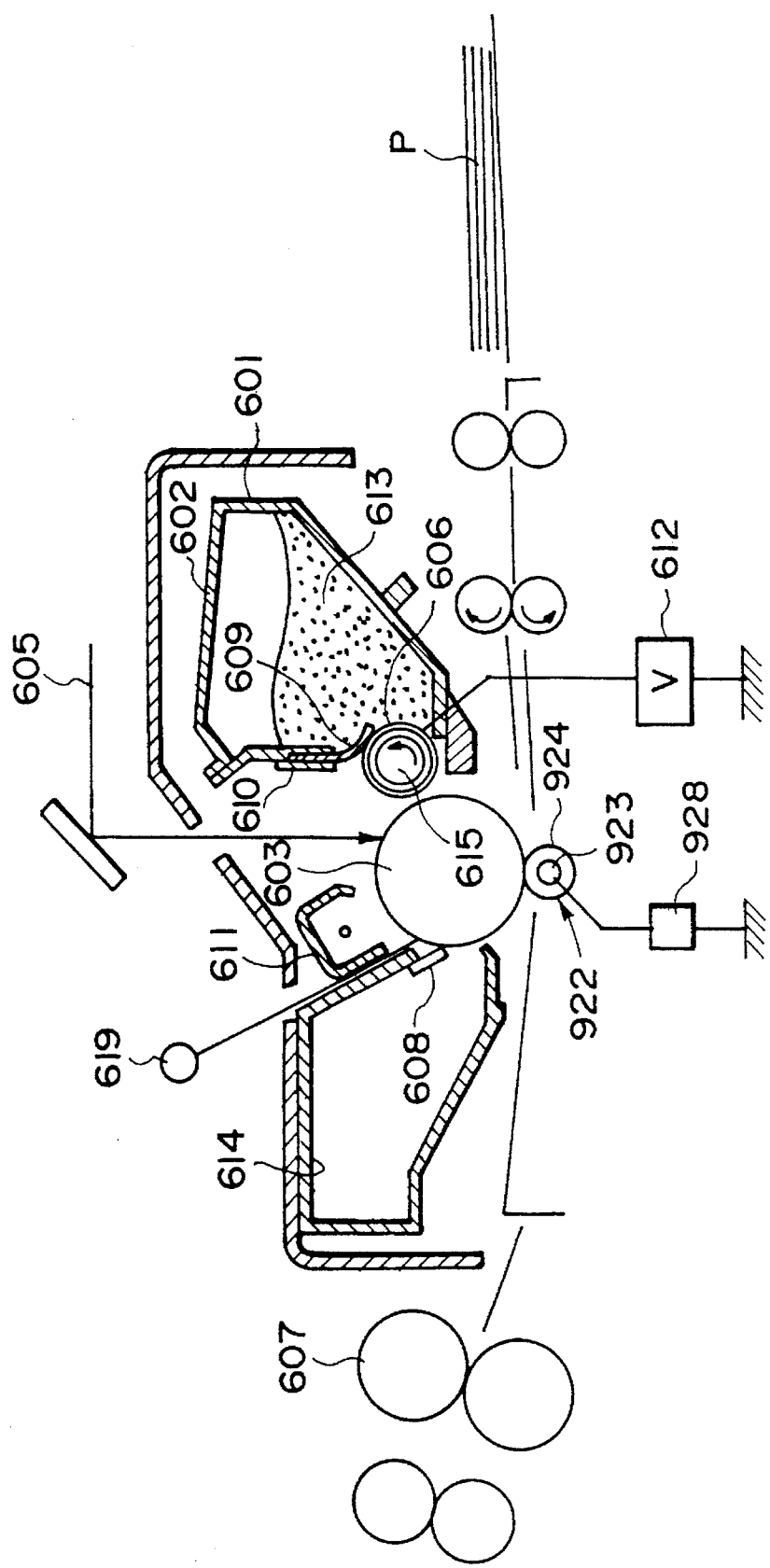
FIG. 9 is a schematic illustration of an example of an image forming apparatus including a transfer roller.
Figure 11A:
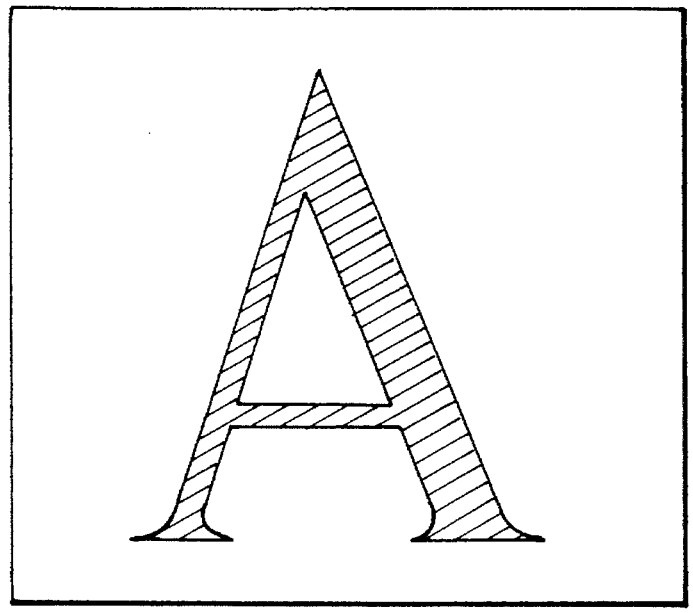
FIG. 11A is an enlarged view of an image sample for evaluating transfer dropout.
Figure 11B:
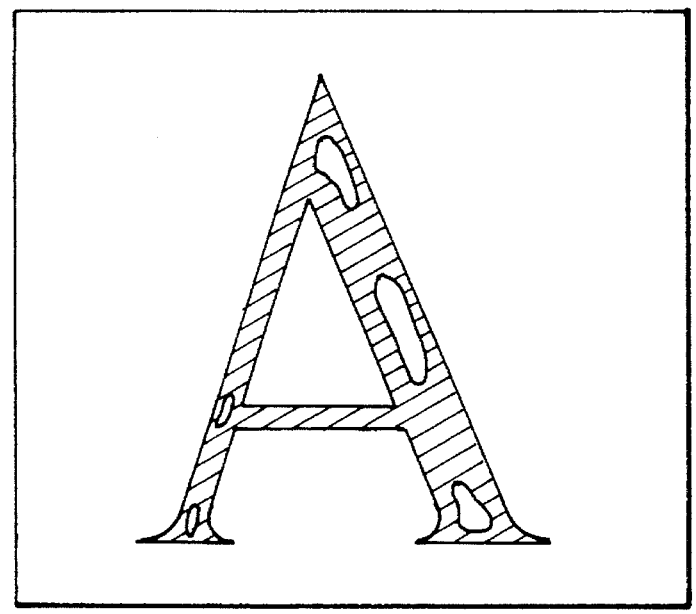
FIG. 11B is an enlarged view of a reproduced image sample accompanied with transfer dropout.

According to the production process of the present invention, it is possible to have toner particles uniformly contain therein inorganic fine powder treated with silicone oil. By using such a toner, it is possible to effectively obviate or suppress the occurrence of "transfer dropout" which can be sometimes caused as illustrated in FIG. 11B when a toner image "A" as shown in FIG. 11A is formed on a photosensitive drum 3 and transferred onto a transfer-receiving medium P by means of a contact transfer means 924 by using an image forming apparatus as shown in FIG. 9.

Some embodiments of the toner production process will now be described with reference to the drawings.

Referring to FIG. 1, the toner materials including binder resin particles and a colorant as essential components and, optionally, a charge control agent, an anti-offset agent, etc., are dry-blended with resin particles carrying or containing inorganic fine powder (optionally together with fine powder recycled from a subsequent classification step). The blending may preferably be performed by a blender capable of blending a powdery material while applying a shearing force to the material by rotation of an upper stirring blade and a lower stirring blade, such as a Henschel mixer as illustrated in FIG. 3.

In advance of the pre-mixing step, the inorganic fine powder can be present in the form of fine secondary particles having an average particle size of at most 100 mμ, preferably at most 70 mμ, carried on the resin particles having a weight-average particle size of, e.g., 4–20 μm, by preliminary blending with the resin particles. As a result, the inorganic fine powder can be uniformly incorporated in the product toner particles. In case where the inorganic fine powder is directly introduced in the pre-mixing system together with the other toner materials without such pre-liminary blending, coarse particles larger than about 70 μm of the inorganic fine powder are present in a substantial amount in the pre-mixing system because of a strong agglomerability of the inorganic fine powder, so that it becomes extremely difficult to incorporate the inorganic fine powder within the product toner particles.

The average secondary particle size of inorganic fine powder on the resin particle surfaces can be measured by taking a microscopic photograph (e.g., at a magnification of $2 \times 10^4$) of the resin particles through an electron microscope and selecting 100–200 fine particles of the inorganic fine powder at random to measure the particle sizes thereof.

In the pre-mixing step, it is preferred to blend 1–50 wt. parts of the resin particles carrying 0.1–5 wt. parts of the inorganic fine powder with 100 wt. parts of binder resin particles and 2–150 wt. parts of a colorant, so as to provide effective and uniform dispersion.

In the present invention, the pre-mixing is followed by a melt-kneading step, which may be performed by an ordinary method including a scheme using an extruder allowing continuous kneading as the most preferred one.

In case where an extruder equipped with a screw (see, e.g., FIG. 4) having a kneading shaft length L and a diameter D in a ratio L/D=17–50 is used for example, a particularly good dispersion is accomplished when the toner materials contain hydrophobic silica treated with silicone oil.

This is presumably because the silicone oil carried with the silica fine powder is dispersed within the toner materials even in a short residence time within the extruder to improve the slippage between the toner materials and thus improve the dispersion of the toner materials.

Then, the kneaded product from the kneading step is discharged onto and cooled on, e.g., a conveyer belt, and the cooled kneaded product is coarsely crushed or pulverized by a crusher, such as a cutter mill or a hammer mill.

Figure 5:
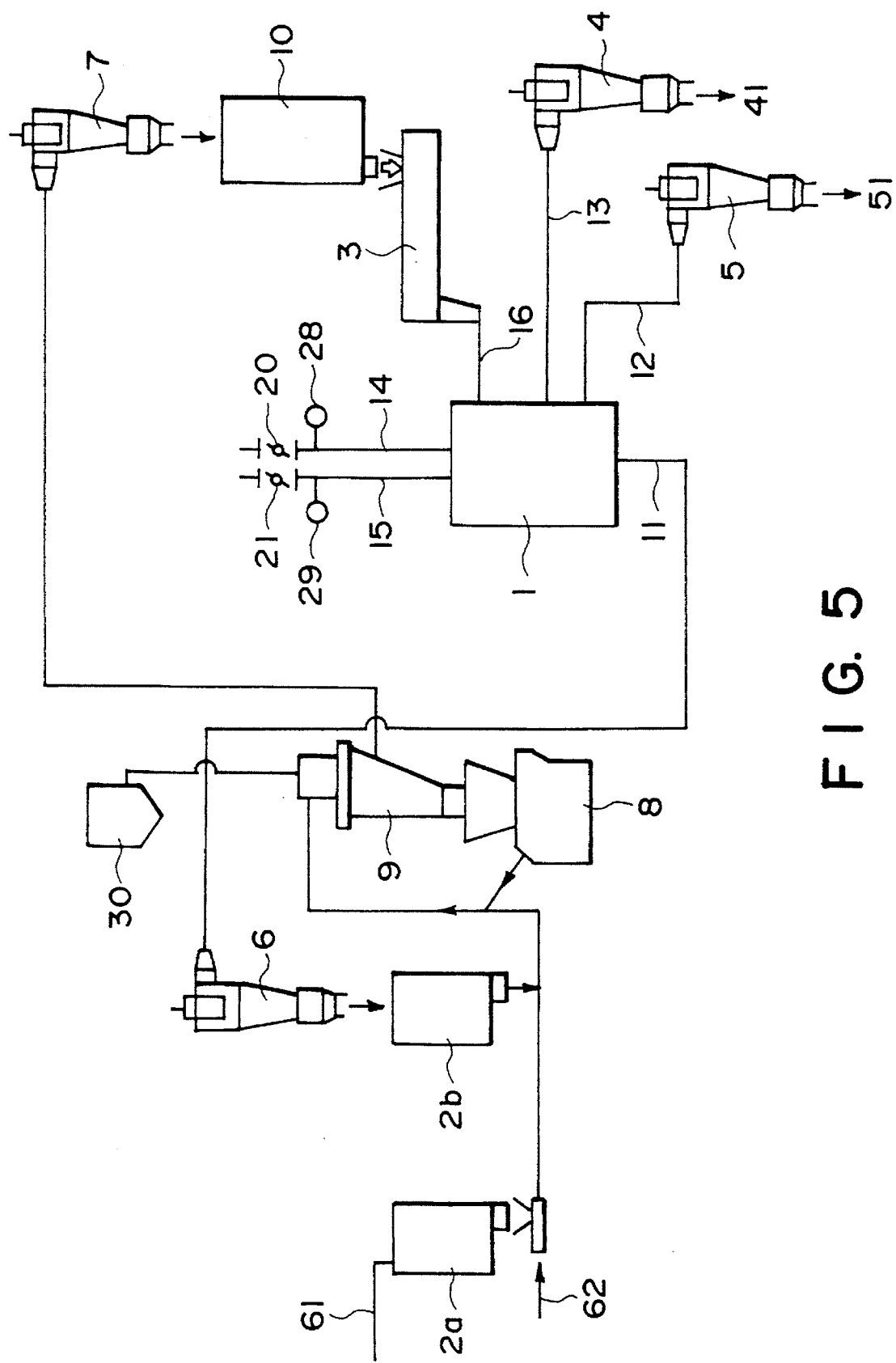
FIG. 5 is a flow diagram showing an embodiment of classification and fine pulverization steps after coarsely crushing a melt-kneaded and cooled product.

The coarsely crushed or pulverized product may be introduced into a classification and fine pulverization system, e.g., as shown in FIG. 5.

Referring to FIG. 5, the system includes a first classifier 9 and a multi-division classifier 1 (three-division classifier in this embodiment), such as an Elbow Jet classifier (available from Nittetsu Kogyo K.K.) utilizing a Coanda effect, used for further classifying a classified powder from the first classifier 9 into fine powder, medium powder and coarse powder.

More specifically, the classification-fine pulverization system includes the three-division classifier 1, metering feeders 2a and 2b, a metering feeder 10, a vibration feeder 3, collecting cyclones 4–7, a fine pulverizer 8, and the first classifier 9 which are connected by communication means.

In the system, the coarsely pulverized product from a line 61 is introduced via the metering feeder 2 into the first classifier 9, from which classified powder separated from a coarse powder fraction is fed via the collecting cyclone 7 to the metering feeder 10 and then introduced via the vibration feeder 3 and a supply nozzle 16 into the three-division classifier 1. On the other hand, the coarse powder fraction from the first classifier 9 is fed to and finely pulverized by the pulverizer 8 and then re-introduced into the first classifier 9 together with freshly supplied coarsely pulverized product. The classified powder from the vibration feeder 3 is introduced into the three-division classifier 1 at a speed of 50–300 m/sec under the action of a suction force exerted by the collecting cyclones 4, 5 and/or 6. Such introduction under suction is preferred to a pressure introduction because a strict sealing of the apparatus is not required.

The size of the classifying zone in the classifier 1 is ordinarily on the order of 10–50 cm×10–50 cm, so that the pulverized product can be separated into three or more fractions in an instant of 0.1–0.01 sec or even shorter. The pulverized product is thus divided by the three-division classifier 1 into coarse powder (particles larger than a prescribed particle size range), medium powder (particles within the prescribed size range) and fine powder (particles below the prescribed range). Then, the coarse powder is recycled via a discharge pipe 11 and the collecting cyclone to the metering feeder 2.

The medium powder is discharged out of the system via a discharge pipe 12 and collected by the collecting cyclone 5 to be recovered as a toner product 51. The fine powder is discharged out of the system via a discharge pipe 13, collected by the collecting cyclone 4 and recovered as fine powder 41 smaller than the prescribed range. The fine powder 41 may be recycled to the pre-mixing step according to the embodiment shown in FIG. 1. As described above, the collecting cyclones 4–6 function as a reduced pressure-generating means for introducing the classified product under suction into the classifying zone of the three-division classifier. The reduced pressure within the classifier 1 may be controlled by dampers 20 and 21 and pressure gauges 28 and 29 provided to pipes 14 and 15.

Fine powder out of the first classifier 9 may be recovered by passing the exhaust air from the top of the classifier 1 to a bag filter 30. The fine powder recovered by the bag filter can also be recycled to the pre-mixing step.

The pulverizer 8 may comprise a fine-pulverization means, such as an impact pulverizer or a jet pulverizer. Commercial examples of the impact pulverizer may include Turbomill (available from Turbo Kogyo K.K.) and commercial examples of the jet pulverizer may include Hypersonic Jet Mill PJM-I (available from Nippon Pneumatic Kogyo K.K.) and Micron Jet (available from Hosokawa Micron K.K.).

The first classifier 9 may for example be a pneumatic classifier.

The medium powder 51 from the classification system can be used toner particles as it is but may preferably be blended with inorganic fine powder or hydrophobicity-imparted inorganic fine powder as described to provide a product toner.

The toner thus obtained can also be blended as desired with an optional external additive other than the inorganic fine powder. Examples of such an optional external additive may include: a charging aid, an electroconductivity-imparting agent, a flowability-improving agent, an anti-caking agent, a release agent for hot-roller fixation, a lubricant, and resinous fine particles or inorganic fine particles used as an abrasive.

Some examples of image forming apparatus using a toner according to the present invention constituted as a magnetic toner will now be described with reference to the drawings.

Figure 6:
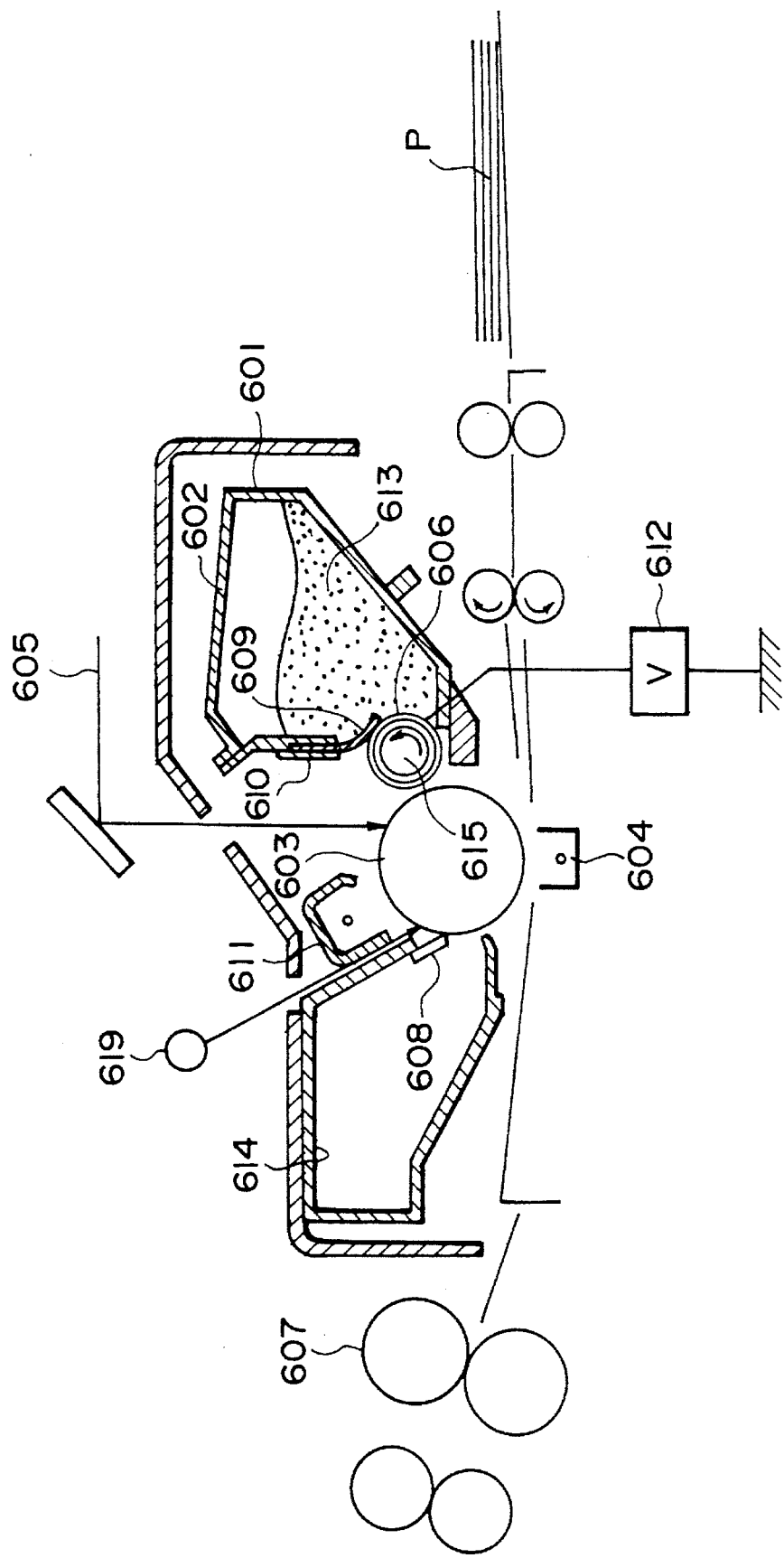
FIGS. 6 and 7 are respectively a schematic illustration of an example of an image forming apparatus using a toner.

FIG. 6 illustrates a preferred embodiment of such image forming apparatus.

Referring to FIG. 6, the surface of an OPC photosensitive drum 603 is negatively charged by a primary charger 611 and subjected to image scanning with laser light 605 to form a digital latent image thereon. Separately, a developing apparatus 601 is equipped with a developing sleeve 606 containing a magnet 615 therein, an elastic blade 609 of urethane rubber disposed in a counter position relative to the rotation of the developing sleeve 606, and a container 602 containing a mono-component type developer 613 comprising a magnetic toner and silica fine powder hydrophobized with silicone oil externally added thereto. The latent image on the photosensitive drum 603 is developed reversely by the developer 613 at a developing zone where an alternating bias, a pulse bias and/or a DC bias is applied by a bias application means 612 between the electroconductive substrate of the photosensitive drum 603 and the developing sleeve 606. As a result, a developed image (toner image) is formed on the photosensitive drum 603. Separately, transfer paper P is conveyed to a transfer zone where the transfer paper P is corona-charged on its back side (opposite to the photosensitive drum 603), whereby the toner image on the photosensitive drum 603 is electrostatically transferred to the transfer paper P. The transfer paper P carrying the toner image is then separated from the photosensitive drum 603 and is subjected to fixation of the toner image by a hot-pressure roller fixing device 607.

The monocomponent-type developer remaining on the photosensitive drum 603 after the transfer step is then removed by a cleaning device 614 equipped with a cleaning blade 608. The photosensitive drum after the cleaning is charge-removed by erase exposure by exposing means 619 and then again subjected to an image forming process starting from the charging step by the primary charger 611.

The photosensitive drum 3 (electrostatic image-bearing member) comprises a photosensitive layer and an electroconductive substrate and rotates so as to move in the same direction as the developing sleeve 606 (rotating in the direction of an arrow) at the developing zone. The developing sleeve 606 comprises a non-magnetic cylinder within which a multi-pole permanent magnet 615 (magnet roll) as a magnetic field-generating means so as not to be rotated. The monocomponent insulating developer 613 in the developing apparatus 601 is applied onto the non-magnetic cylindrical sleeve 606 and provided with, e.g., a negative triboelectric charge due to friction between the sleeve 606 surface and the magnetic toner particles. Further, the elastic doctor blade 609 functions to regulate the resultant developer in a thin and uniform thickness (of, e.g., 30–300 µm) which is thinner than the spacing between the photosensitive drum 603 and the developing sleeve 606 at the developing station so that the developer layer does not directly contact the photosensitive drum 603. The rotation speed of the sleeve 606 is regulated so that the sleeve surface velocity is substantially equal to or close to the speed of the electrostatic image-bearing surface of the photosensitive drum 603.

As described above, an AC or pulse bias may be applied between the sleeve 606 and the photosensitive drum 603 by the bias means 612. The AC bias may for example have a frequency of 200–4000 Hz and a Vpp of 500 to 3000 volts.

At the developing station, the magnetic toner particles are transferred to the electrostatic image side on the photosensitive drum owing to the surface electrostatic force of the photosensitive drum surface carrying the electrostatic image and the action of an AC or pulse bias.

Figure 7:
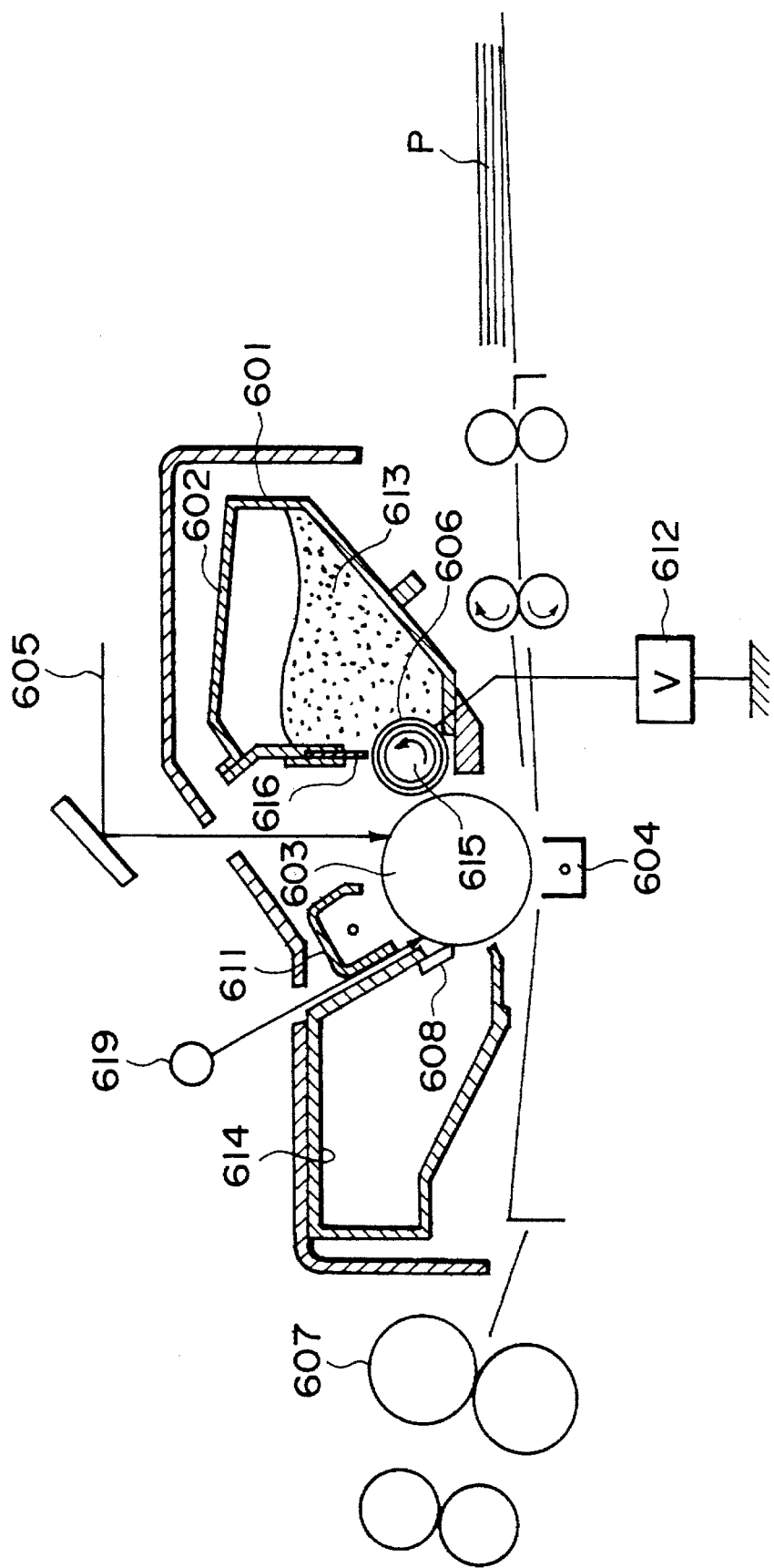

FIG. 7 shows another example of such an image forming apparatus capable of suitably using a magnetic toner according to the present invention.

The image forming apparatus shown in FIG. 7 is different from the apparatus of FIG. 6 in that the layer thickness of a magnetic developer on the developing sleeve 606 is regulated by a magnetic doctor blade 616. In FIG. 7, members identical to those in FIG. 6 are denoted by identical reference numerals.

The magnetic doctor blade of, e.g., iron, is disposed in proximity (spacing of 50–500 μm) with the sleeve surface and in opposition to one magnetic pole of the multi-polar permanent magnet 615 to regulate the developer layer in a thin and uniform thickness (30–300 μm), which is smaller than the spacing between the photosensitive drum 603 and the developing sleeve 606 at the developing station, so as to provide the non-contact relationship. The magnetic doctor blade 616 can be a permanent magnet so as to form a counter magnetic pole instead of iron as described above.

A plurality of the above-mentioned electrostatic image-bearing member like a photosensitive drum, a developing apparatus, the cleaning device and other members constituting an image forming apparatus or electrophotographic apparatus, may be integrally combined to form an apparatus unit, which is detachably mountable to an apparatus body. For example, at least one of the charging means, the developing apparatus and the cleaning device may be supported integrally with the photosensitive drum to form a unit, which may be detachably mountable to an apparatus body in association with a guide means, such as a rail, provided to the apparatus body. In this instance, the charging means and/or the developing apparatus can be also incorporated in the apparatus unit.

Figure 8:
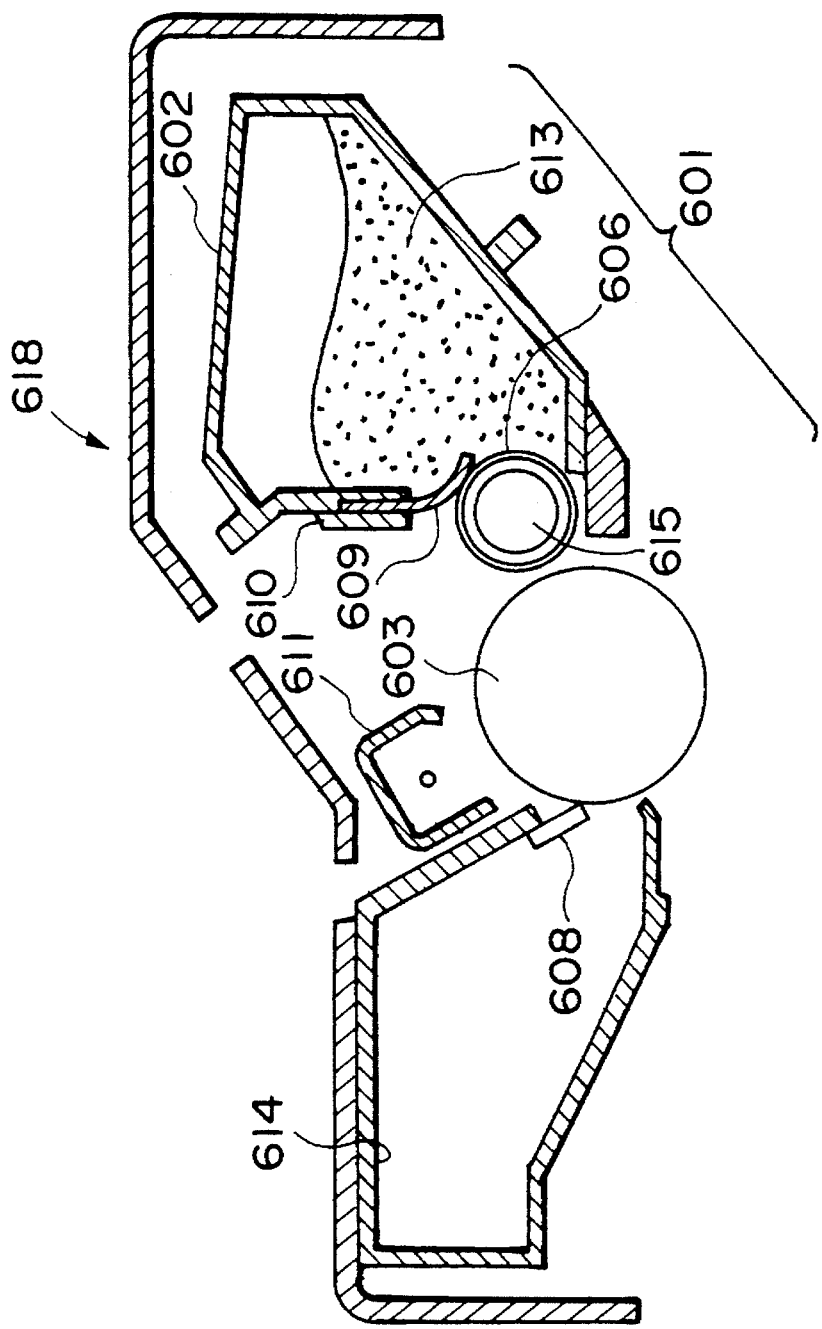
FIG. 8 is an apparatus unit constituting a part of the image forming apparatus shown in FIG. 6.

FIG. 8 shows an example of such an apparatus unit (so-called "cartridge"). More specifically, an apparatus unit 618 shown in FIG. 8 includes a developing apparatus 601, a photosensitive drum 603, a cleaner 614, and a primary charger 611, integrally supported. The apparatus unit is desired to constitute a part of an image forming apparatus according to electrophotography.

The apparatus unit (cartridge) is replaced with a fresh one when the magnetic developer 613 in the developing apparatus 601 is used up.

The developing apparatus 601 is designed to use a mono-component magnetic developer. At the time of developing, a prescribed electric field is formed between the photosensitive drum 603 and the developing sleeve. In order to achieve an effective development, the spacing between the photosensitive drum 603 and the developing sleeve 606 is adjusted to 300 μm as the central value with a tolerance of ±30 μm.

The apparatus unit 618 shown in FIG. 8 includes a developer container 602 for containing a magnetic developer 613, a developing sleeve 606 for carrying and conveying the magnetic developer 613 in the developer container 602 to a developing station confronting the latent image-bearing member 603, and an elastic blade 609 for regulating the developer carried by the developing sleeve 606 and conveyed to the developing station to form a thin layer of the developer having a prescribed thickness.

FIG. 9 shows an example of image forming apparatus including a transfer roller 922 as a transfer means and a bias application means 928 for applying a bias voltage to the transfer roller 922.

The transfer roller 922 may preferably apply a linear (abutting) pressure of at least 3 g/cm onto a photosensitive drum 603. The linear pressure is calculated by the following equation.

(linear pressure)[g/cm]=(total pressure applied to a transfer-receiving material)[g]/(abutting length)[cm].

If the linear (abutting) pressure is below 3 g/cm, a deviation of the transfer-receiving material during conveyance and also a transfer failure due to an insufficient transfer current are liable to occur. The linear pressure may further preferably be at least 20 g/cm, particularly preferably 25–80 g/cm.

The transfer roller 922 comprises a core metal 923 and an electroconductive elastic layer 924. The electroconductive elastic layer 924 may for example comprise a polyurethane resin or an ethylene-propylene-diene terpolymer (EPDM) optionally containing an electroconductive substance, such as electroconductive carbon, to have a volume resistivity of $10^6$–$10^{10}$ Ω.cm. The core metal 923 is supplied with a bias voltage from a constant voltage supply 928. Preferred bias conditions may include a current value of 0.1–50 μA, a voltage (absolute value) of 100–5000 volts, preferably 500–4000 volts.

The toner produced according to the present invention shows a particularly good transfer characteristic when applied to an image forming apparatus including a contact transfer means as shown in FIG. 9.

Hereinbelow, the present invention will be described more specifically while referring to Examples, wherein "parts" and "%" used for describing a formulation are by weight.

EXAMPLE 1

| [Formulation A] | |
|---|---|
| Styrene-n-butyl acrylate copolymer (d (specific gravity) = 1.05, Mw (number-average molecular weight) = 35 × $10^4$, Dav (average particle size in powdery form) = ca. 250 μm) | 100 parts |
| Magnetic iron oxide particles (d = ca. 5, Dav = ca. 0.2 μm) | 60 parts |
| Ethylene-propylene copolymer (d = ca. 1, Mn (number-average molecular weight = ca. 3000) | 4 parts |
| Chromium complex of monoazo dye (d = ca. 1, Dav = ca. 3 μm) | 3 parts |

A formulation (hereinafter called "formulation A") of the above composition was formed into a magnetic toner having a Dw.av (weight-average particle size) of 11 μm through a melt-kneading-pulverization process. Then, 100 parts of the magnetic toner and 0.6 part of silicone oil-treated hydrophobic silica fine powder ($S_{BET}$ (BET specific surface area)= 200 m²/g, treated with 10 wt. % of dimethylsilicone oil) were blended for 3 min. in a Henschel mixer to form a magnetic toner with externally added hydrophobic silica fine powder, which was then introduced into an image forming apparatus as shown in FIG. 7 to effect image formation on a large number of sheets.

After the image formation, a waste toner comprising 100 parts of the magnetic toner and 1.2 parts of silicone oil-treated hydrophobic silica fine powder was recovered in the cleaning device 614, show in FIG. 7. The hydrophobic silica fine powder on the recovered toner particles showed an average secondary particle size of about 40 mμ. In this way, the silica content in the recovered toner was different from that in the toner supplied to the developer container 602 because some hydrophobic silica fine powder preferentially remained on the photosensitive drum 603 without being transferred along with the image-forming toner particles.

167 wt. parts of the above-mentioned formulation A, 15 parts of the recovered toner containing hydrophobic silica fine powder carried on the toner particle surfaces, and 60 parts of fine powder (Dw.av.=ca. 6 μm) separated from a classification step described hereinafter, were dry-blended in a Henschel mixer under the following conditions:

mixing vessel volume: 300 liters
weight of mixed materials: 80 kg
rotation speed of stirring blade: 300 rpm
stirring time: 2 min.

Substantially no attachment of the toner materials was observed within the Henschel mixer.

The above-mentioned premix was melt-kneaded through a twin-screw extruder (having a ratio of L (kneading shaft length)/D (diameter)=30) under heating at 110° C. and a shaft rotation speed of 180 rpm. The resultant kneaded product, after cooling, was coarsely crushed by a hammer mill into particle sizes, of ca. 100–ca. 1000 μm and then pulverized by AMC Pulverizer (available from Hosokawa Micron K.K.) into ca. 50 μm.

The thus-obtained pulverized product was then introduced into a classification-pulverization system shown in FIG. 5 and charged to a first classifier 9 (pneumatic classifier, "DS-10VR" available from Nippon Pneumatic Kogyo K.K.), from which a coarse fraction was finely pulverized by a fine pulverizer 8 ("Jet Mill PMJ-I-10", available from Nippon Pneumatic Kogyo K.K.) and then recycled to the first classifier 9. On the other hand, a fine powder fraction from the first classifier 9 was supplied to a metering feeder 10 and introduced via a vibration feeder 3 into a multi-division classifier 1 using the Coanda effect ("Elbow Jet EJ-45-3" available from Nittetsu Kogyo K.K.) to be classified into coarse powder, medium powder and fine powder. The coarse powder was recycled via a metering feeder 2b to the first classifier 9 and the fine powder was recycled to the pre-mixing step. The classified medium powder showed a Dw.av. ($D_4$)=11.5 μm.

Some toner particles were sliced by a microtome ("Ultracut N" available from Reinhardt Co.) and observed through a transmission-type electron microscope ("H-800" available from Hitachi K.K.), whereby the respective materials were found to be dispersed very well.

100 parts of the above-obtained magnetic toner and 0.6 part of silicone oil-treated hydrophobic silica fine powder in a total amount of 30 kg were charged in a Henschel mixer having a mixing vessel volume of 150 liters and blended for 3 min. at a stirring speed of 1500 rpm to prepare a magnetic toner carrying hydrophobic silica fine powder on its toner particles.

Then, the above-prepared magnetic toner was incorporated in an apparatus unit (toner cartridge) of a commercially available laser beam printer ("LBP-8II", mfd. by Canon K.K.) as shown in FIG. 7 and used for image formation in the following manner. An OPC photosensitive drum was primarily charged at −700 V, and an electrostatic latent image for reversal development was formed thereon. The toner was formed in a layer on a developing sleeve 606 (containing magnet) so as to form a clearance (300 μm) from the photosensitive drum at the developing position. An AC bias (f=1,800 Hz and $V_{RP}$=1,600 V) and a DC bias ($V_{DC}$=−500 V) were applied to the sleeve, and an electrostatic image having a light-part potential of −170 V was developed by the reversal development mode, to form a magnetic toner image on the OPC photosensitive drum. The thus-formed toner image was transferred to plain paper under application of a positive transfer voltage, and then fixed to the plain paper by passing through a hot-pressure roller fixer.

In this way, successive image formation was performed up to 6000 sheets in a normal temperature-normal humidity (23.5° C.-60% RH) environment while replenishing the magnetic toner, as required.

Figure 10:
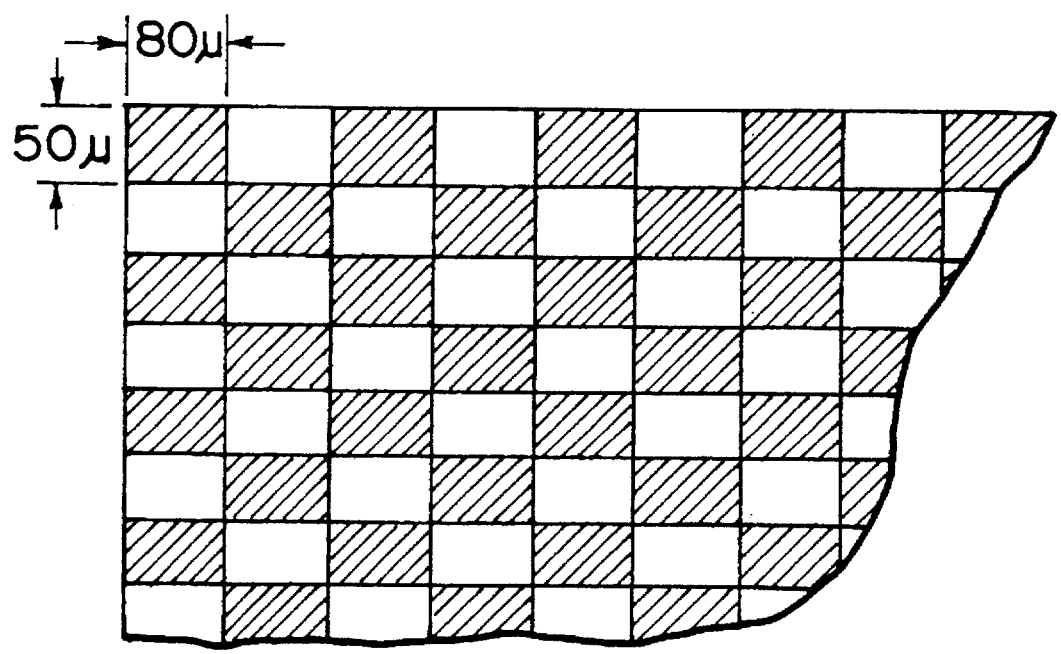
FIG. 10 is a partial enlarged view of a checker pattern for evaluating the developing characteristic of a toner.

The images were evaluated with respect to an image density as measured by a MacBeth reflection densitometer, fog as measured by comparison between a fresh plain paper and a plain paper on which a solid white image was printed with respect to whiteness as measured by a reflection meter (mfd. by Tokyo Denshoku K.K.), and a dot reproducibility after image formation of a checker pattern shown in FIG. 10. The results are shown in Table 1 appearing hereinafter.

Similar image forming tests were performed in a high temperature-high humidity (32.5° C.-85% RH) environment and in a low temperature-low humidity (10° C.-15% RH) environment. The results are also shown in Table 1.

EXAMPLE 2

[Formulation B]

| | |
|---|---|
| Styrene-2-ethylhexyl acrylate copolymer | 100 parts |
| Magnetic iron oxide particles | 100 parts |
| Low-molecular weight polypropylene | 2 parts |
| Dialkylsalicylic acid chromium complex | 2 parts |

Similarly as in Example 1, a magnetic toner (Dw.av.=6.5 μm) was obtained from a formulation B of the above composition. Then, 100 parts of the magnetic toner and 1.2 parts of silicone oil-treated hydrophobic silica fine powder were dry-blended in a Henschel mixer in the same manner as in Example 1 to obtain a magnetic toner with externally added hydrophobic silica fine powder (present on the toner particles in an average secondary particle size of ca. 50 mμ). Then, 20 parts of the magnetic toner with externally added hydrophobic silica fine powder and 100 parts of fine powder (Dw.av.=ca. 4.2 μm) of the kneaded and pulverized formulation B recovered from a subsequent classification step were pre-mixed together with 204 parts of the formulation B in a Henschel mixer in the same manner as in Example 1.

As a result, substantially no attachment of the toner materials was observed within the Henschel mixer.

Then, the resultant premix was melt-kneaded through a single-screw extruder having an L/D ratio of 23 otherwise in the same manner as in Example 1 to obtain a magnetic toner having a Dw.av. ($D_4$)=6.5 μm.

The resultant toner particles showed a very good dispersion of the respective components as a result of slicing by a microtome and observation through a transmission electron microscope in the same manner as in Example 1.

100 parts of the magnetic toner and 0.5 part of silicone oil-treated hydrophobic silica fine powder were blended in a Henschel mixer to prepare a magnetic toner carrying hydrophobic silica fine powder on its toner particles.

Separately, a commercially available laser beam printer ("LBP-8II", mfd. by Canon K.K.) was remodeled with respect to its apparatus unit (toner cartridge) into one as shown in FIG. 6, wherein a urethane rubber-made elastic blade was abutted to an aluminum developing sleeve at an abutting pressure of 30 g/cm.

Then, the above-prepared magnetic toner was incorporated in the re-modeled laser beam printer and used for image formation in the same manner as in Example 1. The results are also shown in Table 1.

EXAMPLE 3

| [Formulation C] | |
| --- | --- |
| Styrene-n-butyl acrylate copolymer | 100 parts |
| Magnetic iron oxide particles | 80 parts |
| Ethylene-propylene copolymer | 4 parts |
| Monoazo dye chromium complex | 3 parts |

A magnetic toner was prepared from a formulation C of the above composition otherwise in the same manner as in Example 1. Then, 100 parts of the magnetic toner and 0.5 part of hydrophobic silica fine powder treated successively with hexamethyldisilazane (10 wt. %) and silicone oil (10 wt. %) were dry-blended in a Henschel mixer in the same manner as in Example 1 to prepare a magnetic toner which was then introduced into an image forming apparatus as shown in FIG. 7 to effect image formation on a large number of sheets.

After the image formation, a waste toner comprising 0.6 part of the hydrophobic silica fine powder treated with hexamethyldisilazane and silicone oil externally added to 100 parts of the magnetic toner was recovered in the cleaning device 614 in FIG. 7. The hydrophobic silica fine powder on the toner particles showed an average secondary particle size of ca. 45 μm.

15 parts of the recovered toner, 3 parts of fine powder (Dw.av.=ca. 5.8 μm) of the formulation C recovered from a subsequent classification step and shaped into a Day=ca. 0.5 mm and 187 parts of the formulation C, were placed in a Henschel mixer and pre-mixed in the same manner as in Example 1.

As a result, substantially no attachment of the toner materials was observed within the Henschel mixer.

Then, the resultant premix was melt-kneaded through a twin-screw extruder having an L/D ratio of 40 otherwise in the same manner as in Example 1 to obtain a magnetic toner having a Dw.av. $(D_4)$=9.2 μm.

The resultant toner particles showed a very good dispersion of the respective components as a result of slicing by a microtome and observation through a transmission electron microscope in the same manner as in Example 1.

100 parts of the magnetic toner and 0.5 part of hydrophobic silica fine powder treated successively with hexamethyldisilazane and silicone oil were blended in a Henschel mixer to prepare a magnetic toner carrying hydrophobic silica fine powder on its toner particles. Then, the magnetic toner was subjected to an image forming test in the same manner as in Example 1. The results are also shown in Table 1.

EXAMPLE 4

| [Formulation D] | |
| --- | --- |
| Styrene-2-ethylhexyl acrylate copolymer | 100 parts |
| Magnetic iron oxide particles | 60 parts |
| Low-molecular weight polypropylene | 4 parts |
| Monoazo dye chromium complex | 3 parts |

Similarly as in Example 1, a magnetic toner (Dw.av.=11.5 μm) was obtained from a formulation B of the above composition. Then, 100 parts of the magnetic toner and 0.6 part of dimethyldichlorosilane-treated hydrophobic silica fine powder were dry-blended in a Henschel mixer in the same manner as in Example 1 to obtain a magnetic toner with externally added hydrophobic silica fine powder (present on the toner particles in an average secondary particle size of ca. 30 mμ). Then, 120 parts of the magnetic toner with externally added hydrophobic silica fine powder and 100 parts of fine powder (Dw.av.=ca. 4 μm) of the kneaded and pulverized formulation D recovered from a subsequent classification step were pre-mixed together with 167 parts of the formulation D in a Henschel mixer in the same manner as in Example 1.

As a result, substantially no attachment of the toner materials was observed within the Henschel mixer.

Then, the resultant premix was melt-kneaded through a twin-screw extruder having an L/D ratio of 16 otherwise in the same manner as in Example 1 to obtain a magnetic toner having a Dw.av. $(D_4)$=11.5 μm.

The resultant toner particles showed a very good dispersion of the respective components as a result of slicing by a microtome and observation through a transmission electron microscope in the same manner as in Example 1.

100 parts of the magnetic toner and 0.6 part of silicone oil-treated hydrophobic silica fine powder were blended in a Henschel mixer to prepare a magnetic toner carrying hydrophobic silica fine powder on its toner particles. The magnetic toner was then subjected to an image formation test in the same manner as in Example 1. The results are also shown in Table 1.

COMPARATIVE EXAMPLE 1

The formulation A alone was subjected to pre-mixing otherwise in the same manner as in Example 1. As a result, the magnetic iron oxide among the toner materials was found adhering to the blades of the Henschel mixer. The resultant premix was then melt-kneaded through a twin-screw extruder having an L/D ratio=14 otherwise in the same manner as in Example 1 to obtain a magnetic toner having a Dw.av $(D_4)$=11.5 μm.

The resultant toner particles showed a slight degree of small agglomerates of the magnetic iron oxide as a result of slicing by a microtome and observation through a transmission electron microscope in the same manner as in Example 1.

100 parts of the magnetic toner and 0.6 part of silicone oil-treated hydrophobic silica fine powder were blended in a Henschel mixer to prepare a magnetic toner carrying hydrophobic silica fine powder on its toner particles. The magnetic toner was then subjected to an image formation test in the same manner as in Example 1. The results are also shown in Table 1.

COMPARATIVE EXAMPLE 2

204 parts of the formulation B, 100 parts of the fine powder of the kneaded and classified formulation B recovered from a classification step and 0.2 part of the silicone oil-treated hydrophobic silica fine powder per se were placed in a Henschel mixer and pre-mixed in the same manner as in Example 1. As a result, a substantial amount of the toner materials was found attached inside the Henschel mixer. Then, a magnetic toner having a Dw.av $(D_4)$=6.4 μm was prepared in the same manner as in Example 1.

The resultant toner particles showed large agglomerates of the magnetic iron oxide therein as a result of slicing by a microtome and observation through a transmission electron microscope in the same manner as in Example 1.

100 parts of the magnetic toner and 0.5 part of silicone oil-treated hydrophobic silica fine powder were blended in a Henschel mixer to prepare a magnetic toner carrying hydrophobic silica fine powder on its toner particles. The magnetic toner was then subjected to an image formation test in the same manner as in Example 1. The results are also shown in Table 1.

TABLE 1

|  | 23.5° C.-60% RH $D_{Ref}$ (image density) | | 32.5° C.-85% RH | | |
|---|---|---|---|---|---|
|  | Initial | Final | $D_{Ref}$ Final | 10° C.-15% RH | |
|  |  |  |  | $D_{Ref}$ Final | Fog*[2]  Dot*[1] |
| Example 1 | 1.43 | 1.41 | 1.40 | 1.43 | ○  ○ |
| 2 | 1.45 | 1.42 | 1.41 | 1.45 | ○  ○ |
| 3 | 1.43 | 1.42 | 1.40 | 1.44 | ○  ○ |
| 4 | 1.42 | 1.30 | 1.40 | 1.38 | ○  ○ |
| Comp.Ex. 1 | 1.45 | 1.37 | 1.39 | 1.23 | ○Δ  ○Δ |
| 2 | 1.42 | 1.25 | 1.27 | 1.21 | ○X  X |

*[1]: Evaluation standard of dot reproducibility
○: 2 or less lacks/100 dots
○Δ: 3–5 lacks/100 dots
Δ: 6–10 lacks/100 dots
X: 11 or more lacks/100 dots
*[2]: Evaluation standards of fog
○: <2.5%
○Δ: 2.5–3.5%
Δ: 3.5–4.5%
ΔX: 4.5–5.5%
X: >5.5%

Transfer Test

The magnetic toners prepared in Examples 1–4 and Comparative Examples 1–2 were respectively introduced into an image forming apparatus including a transfer roller 922 for transferring toner images formed on a photosensitive drum onto plain paper P and subjected to image formation of alphabet characters each in a size of ca. 3 mmH×2 mmW on A4-size plain paper especially for evaluation of "transfer dropout".

The respective toner showed the following results.

TABLE 2

|  | Transfer dropout |
|---|---|
| Example 1 | ⊚ |
| Example 2 | ⊚ |
| Example 3 | ⊚ |
| Example 4 | Δ |
| Comp. Ex. 1 | Δ |
| Comp. Ex. 2 | ○ |

The transfer dropout was evaluated by the number of characters having caused noticeable transfer dropout among 100 character images according to the following standard:
⊚: 0–5 characters
○: 6–10 characters
Δ: 11 or more characters

EXAMPLE 5

| [Formulation E] | |
|---|---|
| Styrene-n-butyl acrylate copolymer (d = 1.05, Mw = 35 × 10⁴, Dav = ca. 250 μm) | 100 parts |
| Magnetic iron oxide particles (d = ca. 5, Dav = ca. 0.2 μm) | 100 parts |
| Ethylene-propylene copolymer (d = ca. 1, Mn = ca. 3000) | 3 parts |
| Chromium complex of monoazo dye (d = ca. 1, Dav = ca. 3 μm) | 2 parts |

A magnetic toner was prepared from a formulation E of the above composition otherwise in the same manner as in Example 1. Then, 100 parts of the magnetic toner and 1.2 parts of silicone oil-treated hydrophobic silica fine powder were dry-blended in a Henschel mixer in the same manner as in Example 1 to prepare a magnetic toner which was then introduced into an image forming apparatus as shown in FIG. 7 to effect image formation on a large number of sheets.

After the image formation, a waste toner comprising 3 parts of the silicone oil-treated hydrophobic silica fine powder externally added to 100 parts of the magnetic toner was recovered in the cleaning device 614 in FIG. 7. The hydrophobic silica fine powder on the toner particles showed an average secondary particle size of ca. 40 μm.

15 parts of the recovered toner and 205 parts of the formulation C, were placed in a Henschel mixer and pre-mixed in the same manner as in Example 1.

The above-mentioned premix was melt-kneaded through a twin-screw extruder (having a ratio of L (kneading shaft length)/D (diameter)=30) under heating at 100° C. and a shaft rotation speed of 200 rpm. The resultant kneaded product was thereafter pulverized and classified in the same manner as in Example 1 to obtain a magnetic toner having a Dav ($D_4$) of 7.0 μm.

Some toner particles were sliced by a microtome ("Ultracut N" available from Reinhardt Co.) and the sliced surfaces were observed through a transmission-type electron microscope ("H-800" available from Hitachi K.K.), whereby the respective materials were found to be dispersed very well.

100 parts of the above-obtained magnetic toner and 1.2 part of silicone oil-treated hydrophobic silica fine powder were dry-blended in a Henschel mixer to prepare a magnetic toner carrying hydrophobic silica fine powder on its toner particles.

Separately, a commercially available laser beam printer ("LBP-8II", mfd. by Canon K.K.) was remodeled with respect to its apparatus unit (toner cartridge) into one as shown in FIG. 6, wherein a urethane rubber-made elastic blade was abutted to an aluminum developing sleeve at an abutting pressure of 30 g/cm.

Then, the above-prepared magnetic toner was incorporated in the re-modeled laser beam printer and used for image formation in the following manner. An OPC photosensitive drum was primarily charged at −700 V, and an electrostatic latent image for reversal development was formed thereon. The developer was formed in a layer on a developing sleeve (containing magnet) so as to form a clearance (300 μm) from the photosensitive drum at the developing position. An AC bias (f=1,800 Hz and $V_{RP}$=1, 600 V) and a DC bias ($V_{DC}$=−500 V) were applied to the sleeve, and an electrostatic image having a light-part potential of −170 V was developed by the reversal development mode, to form a magnetic toner image on the OPC photosensitive drum. The thus-formed toner image was transferred to plain paper under application of a positive transfer voltage, and then fixed to the plain paper by passing through a hot-pressure roller fixer.

In this way, successive image formation was performed up to 6000 sheets in a normal temperature-normal humidity (23.5° C.-60% RH) environment while replenishing the magnetic toner, as required.

The images were evaluated with respect to an image density as measured by a MacBeth reflection densitometer, fog as measured by comparison between a fresh plain paper and a plain paper on which a solid white image was printed with respect to whiteness as measured by a reflection meter (mfd. by Tokyo Denshoku K.K.), and a dot reproducibility after image formation of a checker pattern shown in FIG. 10. The results are shown in Table 3 appearing hereinafter.

Similar image forming tests were performed in a high temperature-high humidity (32.5° C.-85% RH) environment and in a low temperature-low humidity (10° C.-15% RH) environment. The results are also shown in Table 3.

EXAMPLE 6

[Formulation F]

| | |
|---|---|
| Styrene-2-ethylhexyl acrylate copolymer | 100 parts |
| Magnetic iron oxide particles | 60 parts |
| Low-molecular weight polypropylene | 3 parts |
| Dialkylsalicylic acid chromium complex | 3 parts |

Similarly as in Example 1, a magnetic toner (Dw.av.=12 μm) was obtained from a formulation F of the above composition. Then, 100 parts of the magnetic toner and 1.2 parts of silicone oil-treated hydrophobic silica fine powder were dry-blended in a Henschel mixer in the same manner as in Example 1 to obtain a magnetic toner with externally added hydrophobic silica fine powder (present on the toner particles in an average secondary particle size of ca. 50 mμ). Then, 85 parts of the magnetic toner with externally added hydrophobic silica fine powder was pre-mixed together with 166 parts of the formulation F in a Henschel mixer in the same manner as in Example 1.

As a result, substantially no attachment of the toner materials was observed within the Henschel mixer.

Then, the resultant premix was melt-kneaded through a single-screw extruder having an L/D ratio of 22 otherwise in the same manner as in Example 1 to obtain a magnetic toner having a Dw.av. ($D_4$)=12.0 μm.

The resultant toner particles showed a very good dispersion of the respective components as a result of slicing by a microtome and observation through a transmission electron microscope in the same manner as in Example 1.

100 parts of the magnetic toner and 0.5 part of silicone oil-treated hydrophobic silica fine powder were blended in a Henschel mixer to prepare a magnetic toner carrying hydrophobic silica fine powder on its toner particles. The magnetic toner was charged in an apparatus unit (toner cartridge) of a laser beam printer ("LBP-81I") and subjected to image formation in the same manner as in Example 1. The results are also shown in Table 3.

EXAMPLE 7

[Formulation G]

| | |
|---|---|
| Styrene-n-butyl acrylate copolymer | 100 parts |
| Magnetic iron oxide particles | 80 parts |
| Ethylene-propylene copolymer | 4 parts |
| Monoazo dye chromium complex | 2 parts |

A magnetic toner was prepared from a formulation G of the above composition otherwise in the same manner as in Example 1. Then, 100 parts of the magnetic toner and 0.9 part of hydrophobic silica fine powder treated successively with hexamethyldisilazane (10 wt. %) and silicone oil (10 wt. %) were dry-blended in a Henschel mixer in the same manner as in Example 1 to prepare a magnetic toner which was then introduced into in an image forming apparatus as shown in FIG. 7 to effect image formation on a large number of sheets.

After the image formation, a waste toner comprising 2.2 parts of the hydrophobic silica fine powder treated with hexamethyldisilazane and silicone oil externally added to 100 parts of the magnetic toner was recovered in the cleaning device 614 in FIG. 7. The hydrophobic silica fine powder on the toner particles showed an average secondary particle size of ca. 45 μm.

15 parts of the recovered toner and 186 parts of the formulation G, were placed in a Henschel mixer and premixed in the same manner as in Example 1.

Then, the resultant premix was melt-kneaded through a twin-screw extruder having an L/D ratio of 40 otherwise in the same manner as in Example 1 to obtain a magnetic toner having a Dw.av. ($D_4$)=9.2 μm.

The resultant toner particles showed a very good dispersion of the respective components as a result of slicing by a microtome and observation through a transmission electron microscope in the same manner as in Example 1.

100 parts of the magnetic toner and 0.5 part of hydrophobic silica fine powder treated successively with hexamethyldisilazane and silicone oil were blended in a Henschel mixer to prepare a magnetic toner carrying hydrophobic silica fine powder on its toner particles. Then, the magnetic toner was subjected to an image forming test in the same manner as in Example 1. The results are also shown in Table 3.

EXAMPLE 8

[Formulation H]

| | |
|---|---|
| Styrene-n-butyl acrylate copolymer | 100 parts |
| Magnetic iron oxide particles | 65 parts |
| Low-molecular weight polypropylene | 4 parts |
| Monoazo dye chromium complex | 3 parts |

Similarly as in Example 1, a magnetic toner (Dw.av.=11.5 μm) was obtained from a formulation H of the above composition. Then, 100 parts of the magnetic toner and 0.6 part of dimethyldichlorosilane-treated hydrophobic silica fine powder were dry-blended in a Henschel mixer in the same manner as in Example 1 to obtain a magnetic toner with externally added hydrophobic silica fine powder (present on the toner particles in an average secondary particle size of ca. 30 mμ). Then, 100 parts of the magnetic toner with externally added hydrophobic silica fine powder was pre-mixed together with 172 parts of the formulation H in a Henschel mixer in the same manner as in Example 1.

Then, the resultant premix was melt-kneaded through a twin-screw extruder having an L/D ratio of 16 otherwise in the same manner as in Example 1 to obtain a magnetic toner having a Dw.av. ($D_4$)=11.5 μm.

The resultant toner particles showed a very good dispersion of the respective components as a result of slicing by a microtome and observation through a transmission electron microscope in the same manner as in Example 1.

100 parts of the magnetic toner and 0.6 part of silicone oil-treated hydrophobic silica fine powder were blended in a Henschel mixer to prepare a magnetic toner carrying hydrophobic silica fine powder on its toner particles. The magnetic toner was then subjected to an image formation test in the same manner as in Example 1. The results are also shown in Table 3.

TABLE 3

| | 23.5° C.-60% RH $D_{Ref}$ (image density) | | 32.5° C.-85% RH | 10° C.-15% RH | | |
|---|---|---|---|---|---|---|
| | Initial | Final | $D_{Ref}$ Final | $D_{Ref}$ Final | Fog*² | Dot*¹ |
| Example 5 | 1.45 | 1.43 | 1.40 | 1.43 | ○ | ○ |
| 6 | 1.43 | 1.42 | 1.40 | 1.45 | ○ | ○ |
| 7 | 1.43 | 1.43 | 1.41 | 1.43 | ○ | ○ |
| 8 | 1.42 | 1.40 | 1.39 | 1.38 | ○△ | ○ |

What is claimed is:

1. A process for producing a toner for developing electrostatic images, comprising:
   pre-mixing binder resin particles, a colorant and resin particles carrying or containing inorganic fine powder to prepare a premix,
   melt-kneading the premix to obtain a kneaded product,
   cooling the kneaded product to obtain a colored resinous solid,
   pulverizing the colored resinous solid to obtain a pulverized product, and
   classifying the pulverized product to obtain toner particles.

2. The process according to claim 1, wherein the inorganic fine powder has been externally added to the surfaces of the resin particles prior to the premixing.

3. The process according to claim 1, wherein said inorganic fine powder comprises silica fine powder.

4. The process according to claim 3, wherein said inorganic fine powder comprises hydrophobic silica fine powder.

5. The process according to claim 4, wherein said inorganic fine powder comprises hydrophobic silica fine powder treated with silicone oil.

6. The process according to claim 1, wherein said inorganic fine powder comprises hydrophobic titanium oxide fine powder.

7. The process according to claim 6, wherein said inorganic fine powder comprises hydrophobic titanium oxide fine powder.

8. The process according to claim 7, wherein said inorganic fine powder comprises hydrophobic titanium oxide fine powder treated with silicone oil.

9. The process according to claim 1, wherein said inorganic fine powder is carried or contained by the resin particles in the form of particles having a secondary particle size of at most 100 mμ prior to the pre-mixing.

10. The process according to claim 1, wherein said pulverized product is classified into at least coarse powder, medium powder and fine powder, and the classified fine powder is recycled to the pre-mixing.

11. The process according to claim 1, wherein said resin particles carrying or containing inorganic fine powder are contained in a proportion of 1–50 wt. % of the premix.

12. The process according to claim 10, wherein the recycled fine powder and said resin particles carrying or containing inorganic fine powder are contained in a proportion in total of 2–60 wt. % of the premix.

13. The process according to claim 12, wherein the recycled fine powder and said resin particles carrying or containing inorganic fine powder are contained in a weight ratio of 1:20 to 20:1 in the premix.

14. The process according to claim 1, wherein the inorganic fine powder comprises hydrophobic silica fine powder treated with silicone oil, the hydrophobic silica fine powder is dry-blended with resin particles in advance to be carried on the surfaces of the resin particles in the form of secondary particles having an average particle size of at most 100 mμ, and the resin particles carrying the inorganic fine powder, the binder resin powders and the colorant are subjected to the pre-mixing.

15. The process according to claim 1, wherein the inorganic fine powder comprises hydrophobic silica fine powder treated with silicone oil, the hydrophobic silica fine powder is dry-blended with resin particles in advance to be carried on the surfaces of the resin particles in the form of secondary particles having an average particle size of at most 100 mμ, the dry-blend of the hydrophobic silica fine powder and the resin particles are shaped into resin particles, and the resultant resin particles containing the inorganic fine powder, the binder resin powders and the colorant are subjected to the pre-mixing.

16. The process according to claim 1, wherein the binder resin particles have a number-average particle size of 10–1000 μm.

17. The process according to claim 1, wherein the colorant has a number-average particle size of at most 3 μm.

18. The process according to claim 1, wherein said premix contains 100 wt. parts of the binder resin particles, 2–150 wt. parts of the colorant, 0.1–5 wt. parts of the inorganic fine powder and 1–50 wt. parts of the resin particles.

19. The process according to claim 1, wherein said inorganic fine powder comprises silica fine powder and said resin particles comprise toner particles.

20. The process according to claim 19, wherein said inorganic fine powder comprises hydrophobic silica fine powder.

21. The process according to claim 19, wherein said inorganic fine powder comprises hydrophobic silica fine powder treated with silicone oil.

22. The process according to claim 1, wherein said inorganic fine powder comprises titanium oxide fine powder, and said resin particles comprise toner particles.

23. The process according to claim 22, wherein said inorganic fine powder comprises hydrophobic titanium oxide fine powder.

24. The process according to claim 22, wherein said inorganic fine powder comprises hydrophobic titanium oxide fine powder treated with silicone oil.

25. The process according to claim 5, wherein 100 wt.

parts of the silica fine powder has been treated with 1–35 wt. parts of silicone oil.

26. The process according to claim 8, wherein 100 wt. parts of the titanium oxide fine powder has been treated with 1–35 wt. parts of silicone oil.

27. The process according to claim 1, wherein the inorganic fine powder has been treated with silicone oil, and the binder resin particles, the colorant and the resin particles carrying or containing the inorganic fine powder treated with silicone oil are pre-mixed under the action of a shearing force by means of a blender having plural stirring blades.

28. The process according to claim 1, wherein the premix is melt-kneaded by means of an extruder having a kneading shaft length L and a diameter D satisfying a ratio L/D in the range of 17–50.

29. A toner for developing electrostatic images, comprising toner particles each containing a binder resin, a colorant and inorganic fine powder, said toner particles having been produced through a process according to any one of claims 1–28.

* * * * *